(12) United States Patent
Rodriguez Bravo et al.

(10) Patent No.: US 12,613,956 B2
(45) Date of Patent: Apr. 28, 2026

(54) LOG TAMPERING PREVENTION FOR HIGH AVAILABILITY ENVIRONMENTS

(71) Applicant: Kyndryl, Inc., New York, NY (US)

(72) Inventors: Cesar Augusto Rodriguez Bravo, Alajuela (CR); David Alonso Campos Batista, Aurora (CR); Doga Tav, Fredericton (CA); Romelia H. Flores, Keller, TX (US)

(73) Assignee: Kyndryl, Inc., New York, NY (US)

( * ) Notice: Subject to any disclaimer, the term of this patent is extended or adjusted under 35 U.S.C. 154(b) by 336 days.

(21) Appl. No.: 17/672,972

(22) Filed: Feb. 16, 2022

(65) Prior Publication Data

US 2023/0259616 A1     Aug. 17, 2023

(51) Int. Cl.
*G06F 21/55* (2013.01)

(52) U.S. Cl.
CPC ...... *G06F 21/554* (2013.01); *G06F 2221/034* (2013.01); *G06F 2221/2113* (2013.01)

(58) Field of Classification Search
CPC ............. G06F 21/554; G06F 2221/034; G06F 2221/211
See application file for complete search history.

(56) References Cited

U.S. PATENT DOCUMENTS

| | | | |
|---|---|---|---|
| 5,032,979 A | 7/1991 | Hecht et al. | |
| 7,512,979 B1* | 3/2009 | Koike ................ | G06F 21/6209 726/22 |
| 7,661,146 B2 | 2/2010 | Karimzadeh et al. | |
| 7,729,690 B1* | 6/2010 | Huang .............. | H04M 1/72403 455/419 |
| 7,770,032 B2 | 8/2010 | Nesta et al. | |
| 8,090,994 B2 | 1/2012 | Morgan et al. | |
| 8,768,842 B2 | 7/2014 | Aissi | |
| 10,469,525 B2 | 11/2019 | Hittel et al. | |

(Continued)

FOREIGN PATENT DOCUMENTS

| | | |
|---|---|---|
| EP | 2780854 A2 | 9/2014 |
| WO | 2013074631 A2 | 5/2013 |
| WO | 2016097686 A1 | 6/2016 |

OTHER PUBLICATIONS

"Daemon (computing)". Wikipedia The Free Encyclopedia. May 19, 2011 [retrieved on Jun. 24, 2024]. Retrieved from the Internet: <URL: https://web.archive.org/web/20110519094421/ https://en. wikipedia.org/wiki/Daemon_(computing)> (Year: 2011).*

(Continued)

*Primary Examiner* — Carl G Colin
*Assistant Examiner* — Zhe Liu
(74) *Attorney, Agent, or Firm* — Erik Swanson; Andrew D. Wright; Calderon Safran & Wright P.C.

(57) ABSTRACT

A computer-implemented method includes: monitoring an operating system of a server that serves content to client computing devices, wherein the server maintains log files; determining, based on the monitoring, whether commands received at the operating system are indicative of tampering with one or more of the log files; responsive to determining the commands are indicative of tampering with one or more of the log files, performing a predefined security action; and responsive to determining the commands of the user are not indicative of tampering with one or more of the log files, sending the commands to a kernel of the operating system for execution.

20 Claims, 8 Drawing Sheets

(56)                References Cited

U.S. PATENT DOCUMENTS

| | | | | |
|---|---|---|---|---|
| 2005/0232421 | A1 | 10/2005 | Simons et al. | |
| 2007/0006322 | A1 | 1/2007 | Karimzadeh et al. | |
| 2007/0157315 | A1* | 7/2007 | Moran | H04L 63/1425 |
| | | | | 726/23 |
| 2007/0192487 | A1* | 8/2007 | Jakobson | H04L 67/06 |
| | | | | 709/225 |
| 2007/0288768 | A1 | 12/2007 | Nesta et al. | |
| 2008/0126377 | A1* | 5/2008 | Bush | G06F 21/552 |
| 2009/0164377 | A1 | 6/2009 | Aissi | |
| 2010/0088517 | A1 | 4/2010 | Piersol | |
| 2013/0073532 | A1* | 3/2013 | Bachar | G06F 16/2308 |
| | | | | 707/704 |
| 2015/0134619 | A1* | 5/2015 | Factor | G06F 16/164 |
| | | | | 707/663 |
| 2016/0212139 | A1* | 7/2016 | Pike | H04L 63/102 |
| 2017/0091468 | A1* | 3/2017 | Demchenko | G06F 21/6209 |
| 2018/0062909 | A1* | 3/2018 | Upshur | G06F 11/0787 |
| 2018/0121650 | A1* | 5/2018 | Brown | G06F 21/568 |
| 2018/0159882 | A1 | 6/2018 | Brill et al. | |
| 2018/0375891 | A1* | 12/2018 | Juncker | H04L 63/14 |
| 2019/0007436 | A1* | 1/2019 | Dods | H04L 63/1425 |
| 2019/0089720 | A1* | 3/2019 | Aditham | G06F 16/9014 |
| 2019/0347339 | A1* | 11/2019 | Becker | G06F 11/3476 |
| 2020/0119904 | A1* | 4/2020 | Philyaw | H04L 63/105 |
| 2020/0127973 | A1 | 4/2020 | Akyol et al. | |
| 2020/0167446 | A1* | 5/2020 | Azulay | G06F 21/554 |
| 2020/0226292 | A1* | 7/2020 | Feist | G06F 21/602 |
| 2020/0319971 | A1* | 10/2020 | Hegde | G06F 21/6227 |
| 2020/0404007 | A1* | 12/2020 | Singh | G06F 16/24537 |
| 2021/0326035 | A1* | 10/2021 | Jia | G06N 20/00 |
| 2021/0385245 | A1* | 12/2021 | Melson | H04L 63/1433 |
| 2022/0092062 | A1* | 3/2022 | Ferrar | G06F 40/205 |
| 2023/0185915 | A1* | 6/2023 | Rao | G06F 21/554 |
| | | | | 726/22 |

OTHER PUBLICATIONS

"PHP xpath( ) Function". W3Schools Online Web Tutorials. Jan. 8, 2014 [retrieved on Jun. 25, 2024]. Retrieved from the Internet: <URL: https://web.archive.org/web/20140108143000/https://www.w3schools.com/php/func_simplexml_xpath.asp> (Year: 2014).*

"PHP Security 2: Directory Traversal & Code Injection". Acunetix by Invicti. Dec. 7, 2020 [retrieved on Jun. 25, 2024]. Retrieved from the Internet: <URL: https://web.archive.org/web/ 20201207004157/ https://www.acunetix.com/websitesecurity/php-security-2/> (Year: 2020).*

Soriano-Salvador et al., "SealFS: Storage-based tamper-evident logging," Computers & Security 108 (Year: 2021).*

Mell et al., "The NIST Definition of Cloud Computing", NIST, Special Publication 800-145, Sep. 2011, 7 pages.

Unknown, "Logs Security & Integrity", Softpanorama, http://www.softpanorama.org/Logs/log_security.shtml, May 16, 1997, 12 pages.

Unknown, "Protect Your Logs from Tampering", Oreilly, https://www.oreilly.com/library/view/network-security-hacks/0596006438/ch01s06.html, downloaded Apr. 16, 2021, 5 pages.

Unknown, "System to Detect Server Breaches Based on a Secure Anti-Forgery Log", IP.com, IP.com No. IPCOM000264436D, Dec. 16, 2020, 4 pages.

Masaya Sato et al., "VMM-Based Log-Tampering and Loss Detection Scheme", https://www.researchgate.net/publication/282877678, Graduate School of Natural Science and Technology Okayama University Japan, downloaded Nov. 23, 2021, 11 pages.

Otander, "Detect Anomalies in System Logs Using Blockchain", https://uledger.co/blog/detect-anomalies-in-system-logs-using-blockchain/, accessed Feb. 4, 2022, 6 pages.

Davenport et al., "Queue Logs", https://wiki.asterisk.org/wiki/display/AST/Queue+Logs, accessed Feb. 4, 2022, 2 pages.

Anonymous, "Request Based Log Queue," from https://github.com/egymgmbh/log-queue which has been moved to https://bitbucket.org/egym-com/log-queue/src/master/, accessed Feb. 9, 2022, 3 pages.

Anonymous, "uncompyle6 3.8.0", https://pypi.org/project/uncompyle6/, Oct. 29, 2021, 9 pages.

Anonymous, "Enterprise Software", https://www.ca.com/us/modern-software-factory/content/practical-blockchain-tamper-proof-system-logs.html, accessed Feb. 11, 2022, 6 pages.

Vanlightly, "Event-Driven Architectures—Queue vs Log—A Case Study", https://jack-vanlightly.com/blog/2018/5/21/event-driven-architectures-queue-vs-log-case-study, May 21, 2018, 13 pages.

* cited by examiner 91 92 93 94 95 Log Security 96

WORKLOADS 90

81 82 83 84 85

MANAGEMENT 80

71 72 73 74 75

VIRTUALIZATION 70

61 62 63 64 65 66 67 68

HARDWARE AND SOFTWARE 60

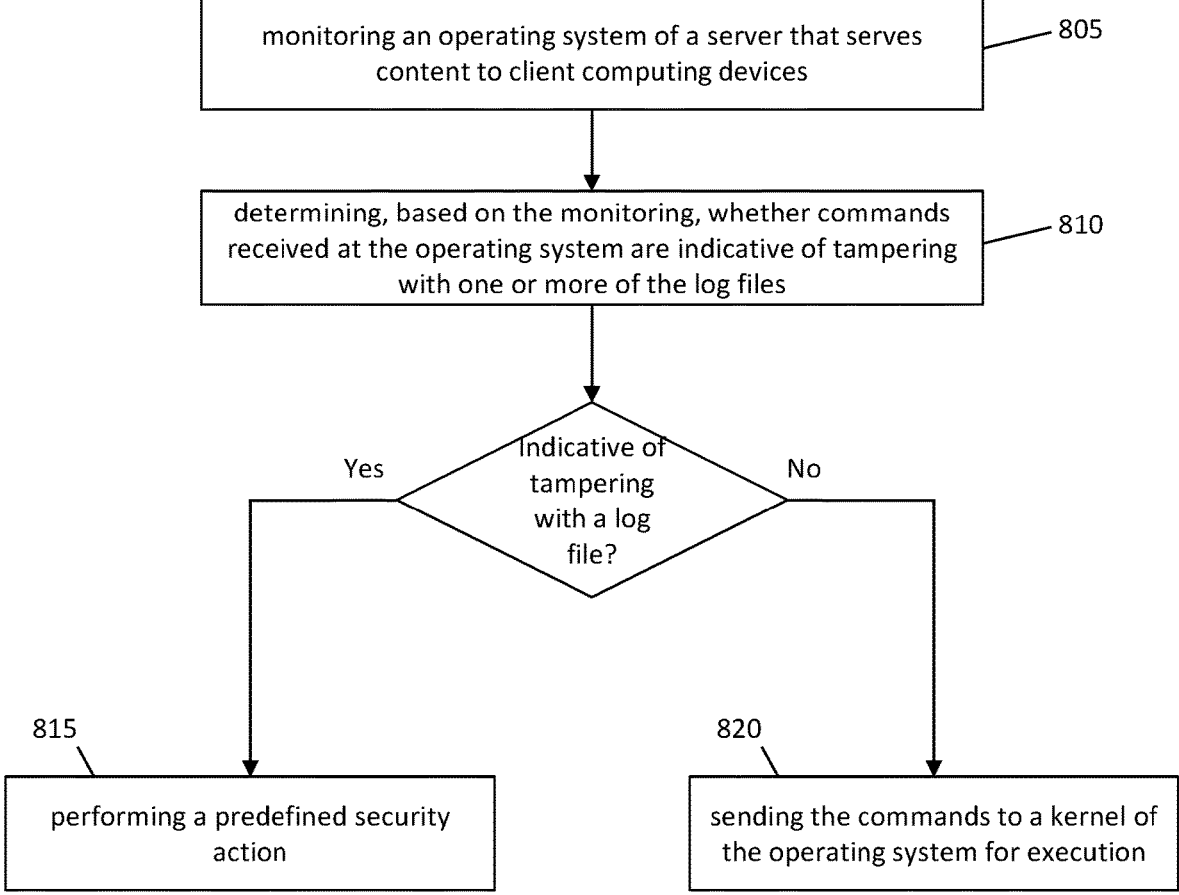

monitoring an operating system of a server that serves
content to client computing devices — 805 determining, based on the monitoring, whether commands
received at the operating system are indicative of tampering
with one or more of the log files — 810

Indicative of
tampering
with a log
file?

Yes

No

815 performing a predefined security
action

820 sending the commands to a kernel of
the operating system for execution

FIG. 8

LOG TAMPERING PREVENTION FOR HIGH AVAILABILITY ENVIRONMENTS

BACKGROUND

Aspects of the present invention relate generally to computer security and, more particularly, to log tampering prevention for high availability environments.

A log file is a computer-generated data file that contains information about usage patterns, activities, and operations within an operating system, application, server, or another device. Log files are useful for monitoring events that occur on a computing device such as a server computing device that serves content to client computing devices.

SUMMARY

In a first aspect of the invention, there is a computer-implemented method including: monitoring an operating system of a server that serves content to client computing devices, wherein the server maintains log files; determining, based on the monitoring, whether commands received at the operating system are indicative of tampering with one or more of the log files; responsive to determining the commands are indicative of tampering with one or more of the log files, performing a predefined security action; and responsive to determining the commands of the user are not indicative of tampering with one or more of the log files, sending the commands to a kernel of the operating system for execution.

In another aspect of the invention, there is a computer program product including one or more computer readable storage media having program instructions collectively stored on the one or more computer readable storage media. The program instructions are executable to: monitor an operating system of a server that serves content to client computing devices, wherein the server maintains log files; determine, based on the monitoring, whether commands received at the operating system are indicative of tampering with one or more of the log files; responsive to determining the commands are indicative of tampering with one or more of the log files, perform a predefined security action; and responsive to determining the commands of the user are not indicative of tampering with one or more of the log files, send the commands to a kernel of the operating system for execution.

In another aspect of the invention, there is system including a processor, a computer readable memory, one or more computer readable storage media, and program instructions collectively stored on the one or more computer readable storage media. The program instructions are executable to: monitor an operating system of a server that serves content to client computing devices, wherein the server maintains log files; determine, based on the monitoring, whether commands received at the operating system are indicative of tampering with one or more of the log files; responsive to determining the commands are indicative of tampering with one or more of the log files, perform a predefined security action; and responsive to determining the commands of the user are not indicative of tampering with one or more of the log files, send the commands to a kernel of the operating system for execution.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 8 shows a flowchart of an exemplary method in accordance with aspects of the invention.

DETAILED DESCRIPTION

Figure 1:
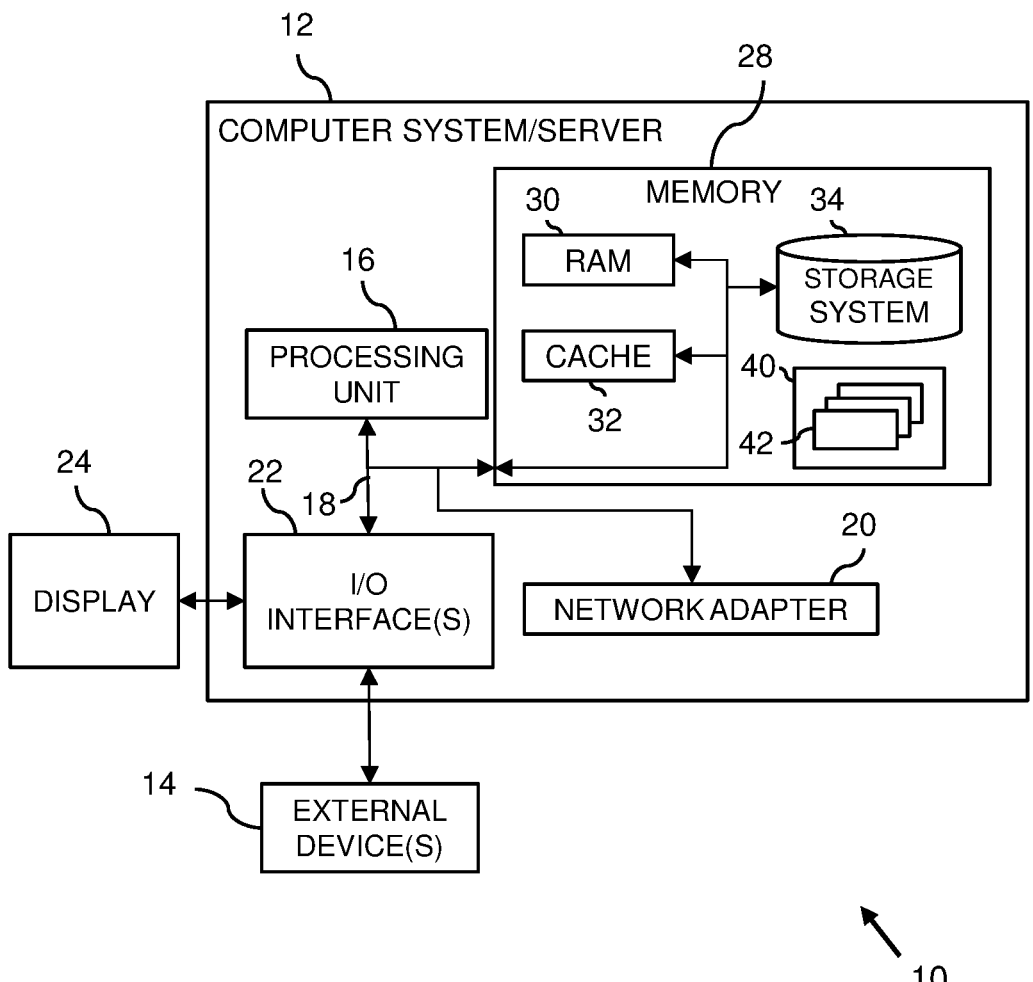
FIG. 1 depicts a cloud computing node according to an embodiment of the present invention.

Aspects of the present invention relate generally to computer security and, more particularly, to log tampering prevention for high availability environments. Implementations of the invention capture events aimed at attacking the integrity of system log files in high availability environments.

Malicious users that attack a computing system often attempt to modify or delete log files of the system to cover their tracks. Logs and the files they contain (log file) are a valuable tool in cyber security, especially in the detection of attacks and the application of remediation to avoid further attacks. As a result of the records that logs keep, attackers often tamper with logs in order to avoid detection and keep a backdoor open for future attacks on the same system. Therefore, there is an increasing need to have a new way of tracking logs that prevents forgery of the logs and keeps the integrity of that important data.

Implementations of the invention address this problem by providing a system that detects actions that are aimed at attacking the integrity of logs. In embodiments, a daemon monitors and identifies activities that indicate a preparation to delete, modify, or remove a log file, such as: commands navigating to folders or directories that contain log files (e.g., a /logs folder); commands requesting permission over folders or directories that contain log files; commands requesting permissions over log files; and commands to update or modify a log that are received from a non-system user (since most logs are created by application and system accounts, such that any attempt to modify a log file by a normal user may be indicative of a tampering attempt). In embodiments, the system selects one or more security actions that are available and immediately applies the selected security action(s) based on the actions performed.

Implementations of the invention thus provide a system that proactively detects any attempt to modify, alter, delete or tamper a given log file before it actually occurs. In embodiments, the system proactively prevents an escalation of privilege attacks over a log file. In embodiments, the system performs a background copy (backup) in case the log file was corrupted or modified. In embodiments, the system determines a best security action based on the potential impact on the performance of the server (e.g., for high availability environments). Implementations of the invention thus provide an improvement in the technical field of computer security by determining when commands received at the operating system are indicative of tampering with one or more of the log files and performing a predefined security action in response.

It should be understood that, to the extent implementations of the invention collect, store, or employ personal information provided by, or obtained from, individuals (for example, user credentials, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
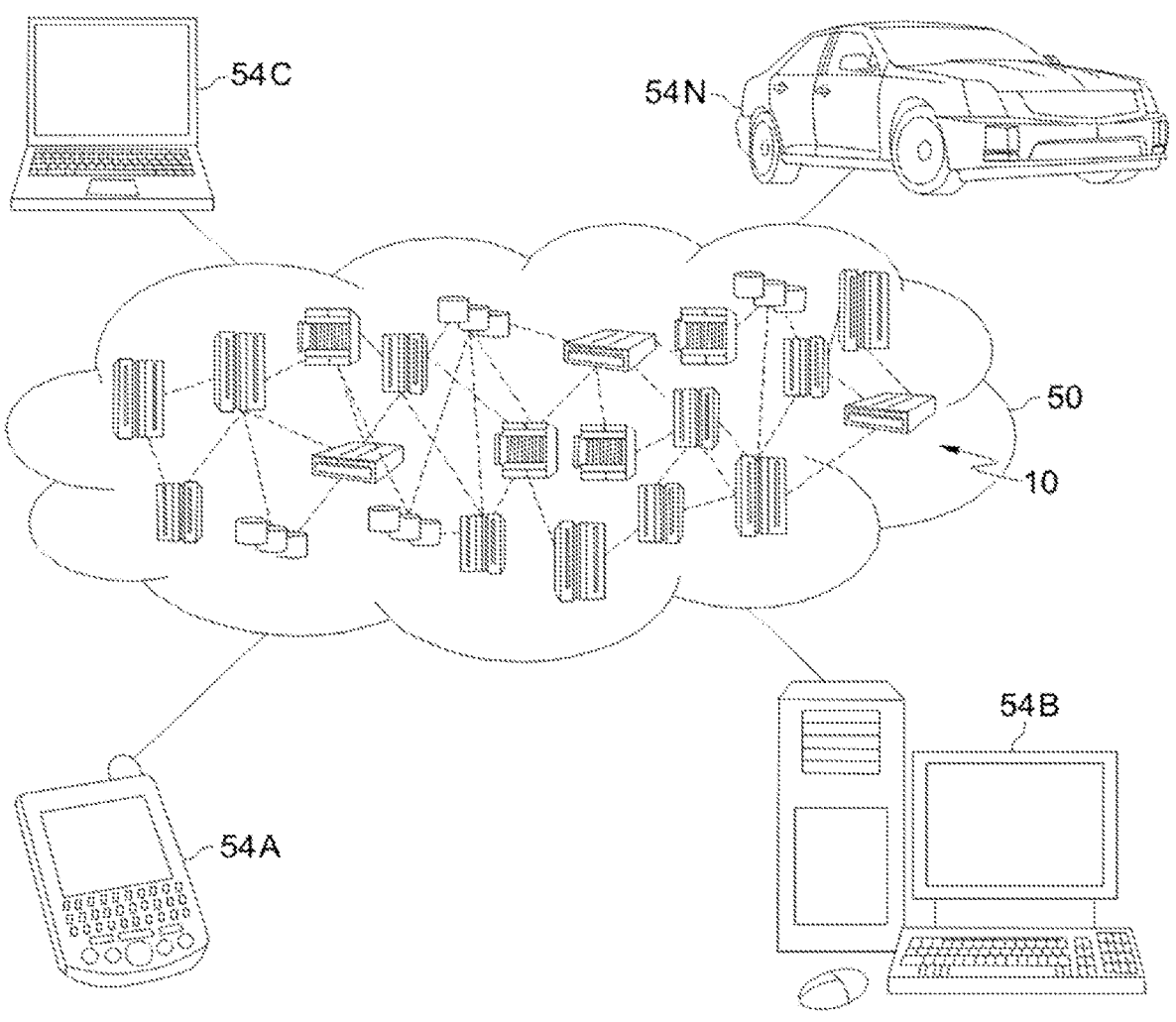
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
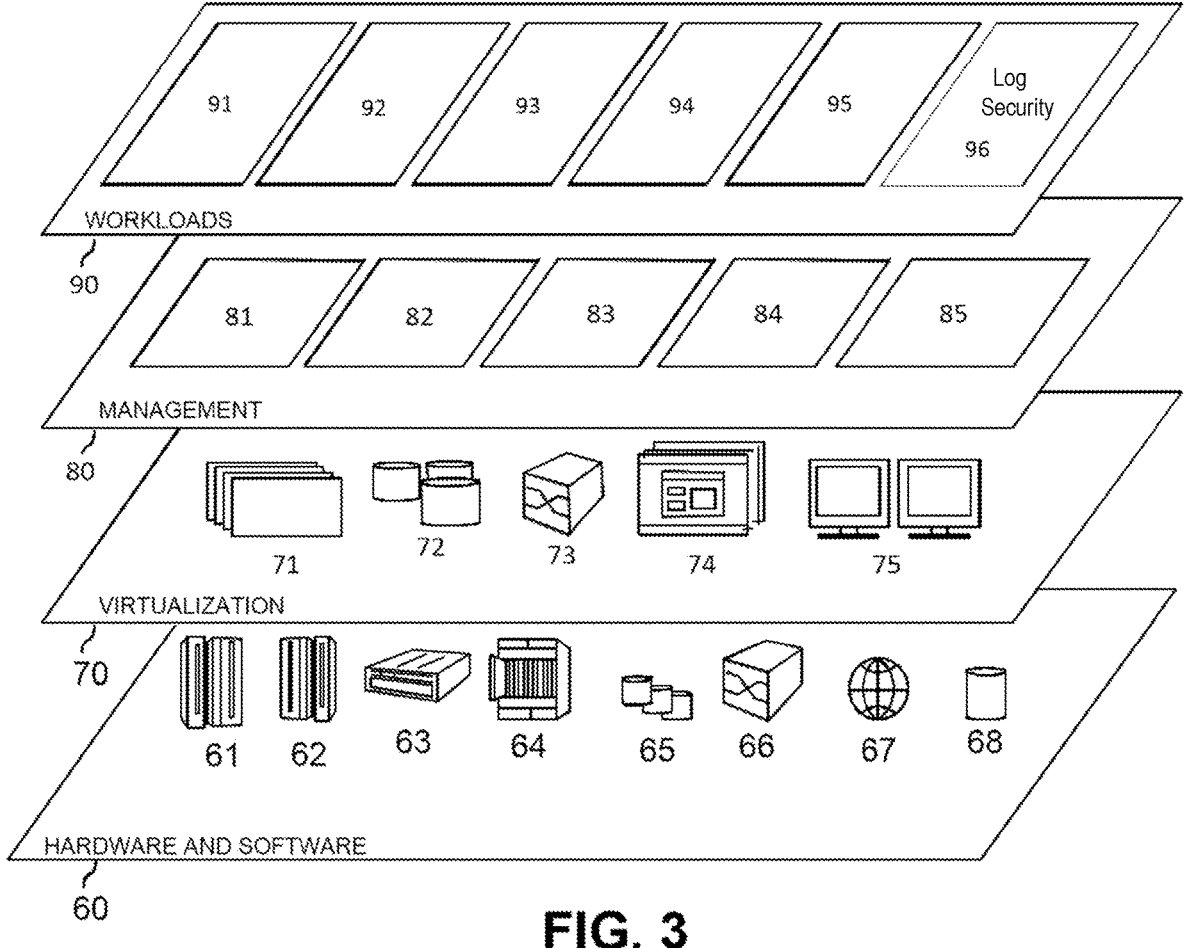
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log security 96.

Implementations of the invention may include a computer system/server 12 of FIG. 1 in which one or more of the program modules 42 are configured to perform (or cause the computer system/server 12 to perform) one of more functions of the log security 96 of FIG. 3. For example, the one or more of the program modules 42 may be configured to: monitor an operating system of a server that serves content to client computing devices, wherein the server maintains log files; determine, based on the monitoring, whether commands received at the operating system are indicative of tampering with one or more of the log files; responsive to determining the commands are indicative of tampering with one or more of the log files, perform a predefined security action; and responsive to determining the commands of the user are not indicative of tampering with one or more of the log files, send the commands to a kernel of the operating system for execution.

Figure 4:
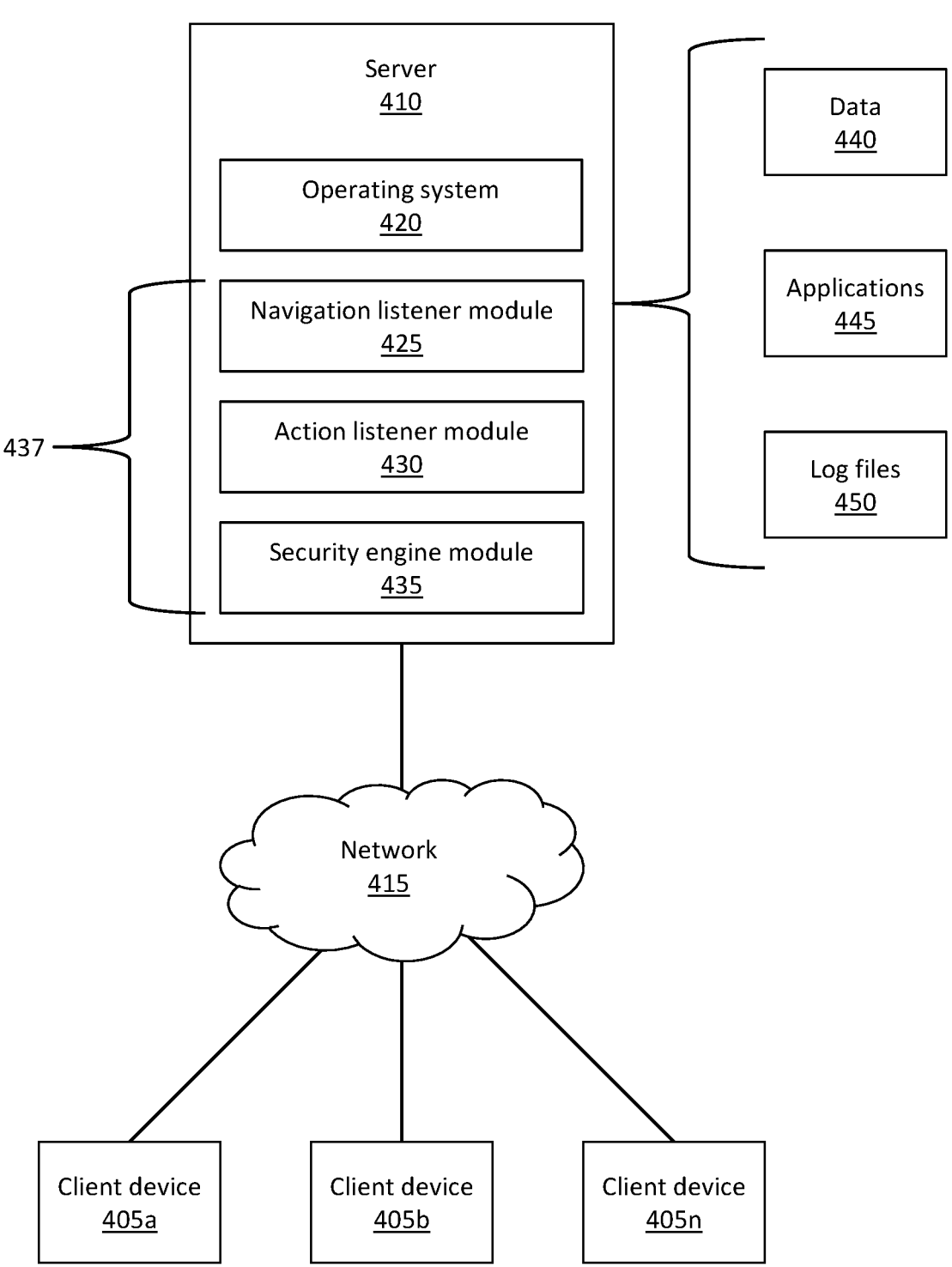
FIG. 4 shows a block diagram of an exemplary environment in accordance with aspects of the invention.

FIG. 4 shows a block diagram of an exemplary environment in accordance with aspects of the invention. In embodiments, the environment includes client devices 405a, 405b, . . . , 405n in communication with a server 410 via a network 415. The network 415 may be any suitable communication network or combination of communication networks including, for example, one or more of a LAN, WAN, and the Internet. Each of the client devices 405a-n may be a client computing device such as a laptop computer, desktop computer, tablet computer, smartphone, etc., and may comprise one or more elements of the computer system 12 of FIG. 1. The server 410 may comprise a server computing device including one or more elements of the computer system 12 of FIG. 1. In embodiments, the server 410 serves content, such as data 440 and applications 445, to the client devices 405a-n.

The server 410 comprises an operating system (OS) 420 that manages tasks and resources of the server 410. In implementations, the OS 420 generates and stores log files 450, which are records the server 410 maintains for administrators to monitor events. In implementations of the invention, the log files 450 contain messages about the server 410, including the kernel, services, and applications running on the server 410. For example, the log files 150 may include application logs, event logs, service logs, and system logs.

In embodiments, the server 410 comprises a navigation listener module 425, an action listener module 430, and a security engine module 435, each of which may comprise one or more program modules such as program modules 42 described with respect to FIG. 1. In one example, the navigation listener module 425, action listener module 430, and security engine module 435 are comprised in a daemon 437 that runs in the background and has direct access to the kernel instructions of the OS 420. The server 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In accordance with aspects of the invention, the navigation listener module 425 listens to (e.g., monitors) navigation instructions of the OS 420. In embodiments, navigation instructions include instructions to navigate to a directory or folder in the system. In one exemplary implementation, the OS 420 is a Linux® operating system, and the navigation listener module 425 monitors navigation instructions of the OS 420 for any of "cd", "cd..", "cd/", and "cd~". According to aspects of the invention, based on this monitoring, the navigation listener module 425 identifies any navigation instructions that include or navigate to a directory or folder that contains one or more of the log files 450. In the example of the Linux® operating system, log files are typically stored in a directory and subdirectory named "/var/log". Accordingly, in this example, the navigation listener module 425 monitors the navigation instructions of the OS 420 and flags as a "warning" (also called a "navigation warning") any such navigation instructions that include "/var/logs" or any subdirectory thereof. For example, the navigation listener module 425 would flag the navigation instruction "cd/usr/var/log" as a warning. In another example, the navigation listener module 425 would flag the navigation instruction "cd/var/log/syslog" as a warning. In additional embodiments, navigation instructions may additionally or alternatively include commands that request permission over a folder containing the log files 450 and/or commands that request permission over one or more of the log files 450. In the example of the Linux® operating system, the command "chmod" changes permissions over a file or folder, and the command "chown" changes ownership of a file or folder. Accordingly, in this example, the navigation listener module 425 monitors the navigation instructions of the OS 420 and flags as a "warning" any such navigation instructions that include "chmod" or "chown" for any of the log files 450 or any of the folders containing any of the log files 450.

In accordance with aspects of the invention, the action listener module 430 listens to (e.g., monitors) file actions of the OS 420. In embodiments, file actions are commands that perform actions on files. In the example of the Linux® operating system, the action listener module 430 monitors the file actions of the OS 420 and flags as a "warning" (also called an "action warning") a file action that includes any of the "rm", "del", and "unlink" commands, which can be used to remove files from a directory. In the example of the Linux® operating system, the action listener module 430 monitors the file actions of the OS 420 and flags as a "threat" (also called an "action threat") a file action that includes the "vi" command (which can be used to edit a file) and/or the "cat" command (which can be used to write text into a file).

In accordance with aspects of the invention, the security engine module 435 receives data from the navigation listener module 425 and the action listener module 430 for the purpose of determining whether there is an indication of tampering with the log files 450, and determines whether to take one or more security actions in the event that tampering is indicated. In embodiments, in response to receiving data from the navigation listener module 425 indicating a warning, the security engine module 435 causes the daemon 437 to enable (e.g., run in) a secure mode. In embodiments, when the daemon 437 is in the secure mode, the daemon 437 filters all commands before sending the commands to the kernel of the OS 420 for execution. In embodiments, the daemon 437 filters the commands to pause any file actions that are flagged as a warning or a threat by the action listener module 430. For example, while operating in the secure mode, the daemon 437 pauses a file action that is flagged as a warning or threat. In embodiments, pausing means that the daemon 437 does not send the file action to the kernel for execution while the daemon 437 determines one or more security actions to take based on the file action.

In one example, when the daemon 437 is operating in secure mode and receives an indication from the action listener module 430 that a file action is flagged as a warning, the daemon 437 attempts to validate the file action by requesting multi-factor authentication (MFA) and/or external validation. If the daemon 437 successfully validates the file action (e.g., using MFA or external validation), then the daemon 437 sends the file action to the kernel for execution. If the daemon 437 does not validate the file action, then the daemon 437 does not send the file action to the kernel for execution and, in some embodiments, the daemon 437 takes further action such as one or more of: locking the computer; locking the user; and alerting the system owner.

In another example, when the daemon 437 is operating in secure mode and receives an indication from the action listener module 430 that a file action is flagged as a threat, the daemon 437 monitors an exit command associated with the file action. If a command is issued to save the file that is the target of the file action after close, then the daemon 437 attempts to validate the file action by requesting MFA and/or external validation. If the daemon 437 successfully validates the file action, then the daemon 437 sends the file action to the kernel for execution. If the daemon 437 does not validate the file action, then the daemon 437 does not send the file action to the kernel for execution and, in some embodiments, the daemon 437 takes further action such as one or more of: locking the computer; locking the user; and alerting the system owner.

In accordance with additional aspects of the invention, the security engine module 435 includes a component that acts as a wrapper layer that is configured to handle "action inside scripts" cases using decompile methods if it finds a running program that is not recognized (e.g., registered). In embodiments, the wrapper layer of the security engine module 435 is configured to identify file action commands that are inside scripts, such as a bash script in the example of the Linux® operating system. In embodiments, the wrapper layer monitors the OS 420 for scripts that are not recognized. In response to identifying a script that is not recognized, the wrapper layer decompiles the unrecognized script using a decompiler tool that translates bytecode back into equivalent source code, and analyzes the equivalent source code for navigation instructions and file actions in a similar manner as already described herein. In this way, the wrapper layer determines whether the unrecognized script has navigation instructions and file actions that pose a threat to one of the log files 450. In the event such a script is associated with a valid user of the system, the security engine module 435 generates an alert to the system owner. In the event such as script is not associated with a valid user of the system, the security engine module 435 stops execution of the script.

In some implementations, the server 410 is included in a high-availability environment, such as a cloud environment. For example, the server 410 may comprise a node 10 in the cloud environment 50 of FIG. 2, and the client devices 405*a-n* may comprise local computing devices 54A-N used by cloud consumers. In these high-availability environments, embodiments may include additional actions designed to avoid disruption (e.g., down time or lag) while maintaining the integrity of the log files 450. In these embodiments, in response to receiving data from the navigation listener module 425 or the action listener module 430 indicating a warning or a threat, the security engine module 435 performs a copy of the log (e.g., all log files 450) in the background, renames the log (e.g., as "original+date.log"), sends an alert to the system administrator including both logs (e.g., the copy and the renamed original), and keeps track of (e.g., monitors and records) user actions directed toward the log (e.g., any commands that navigate to the log or perform an action on one of the log files 450 in the log). The alert may indicate that a user altered the log (or a particular one of the log files 450). The monitoring and recording of user actions may be useful to determine, at a later time, exactly what action were taken with the log, which can be useful to determine a level of compromise of data breach. In embodiments, the daemon 437 performs one or more of the actions descried herein (e.g., requesting MFA, external validation, locking the computer, locking the user, and alerting the system owner) in addition to the copying the log, renaming the log, etc.

Figure 5:
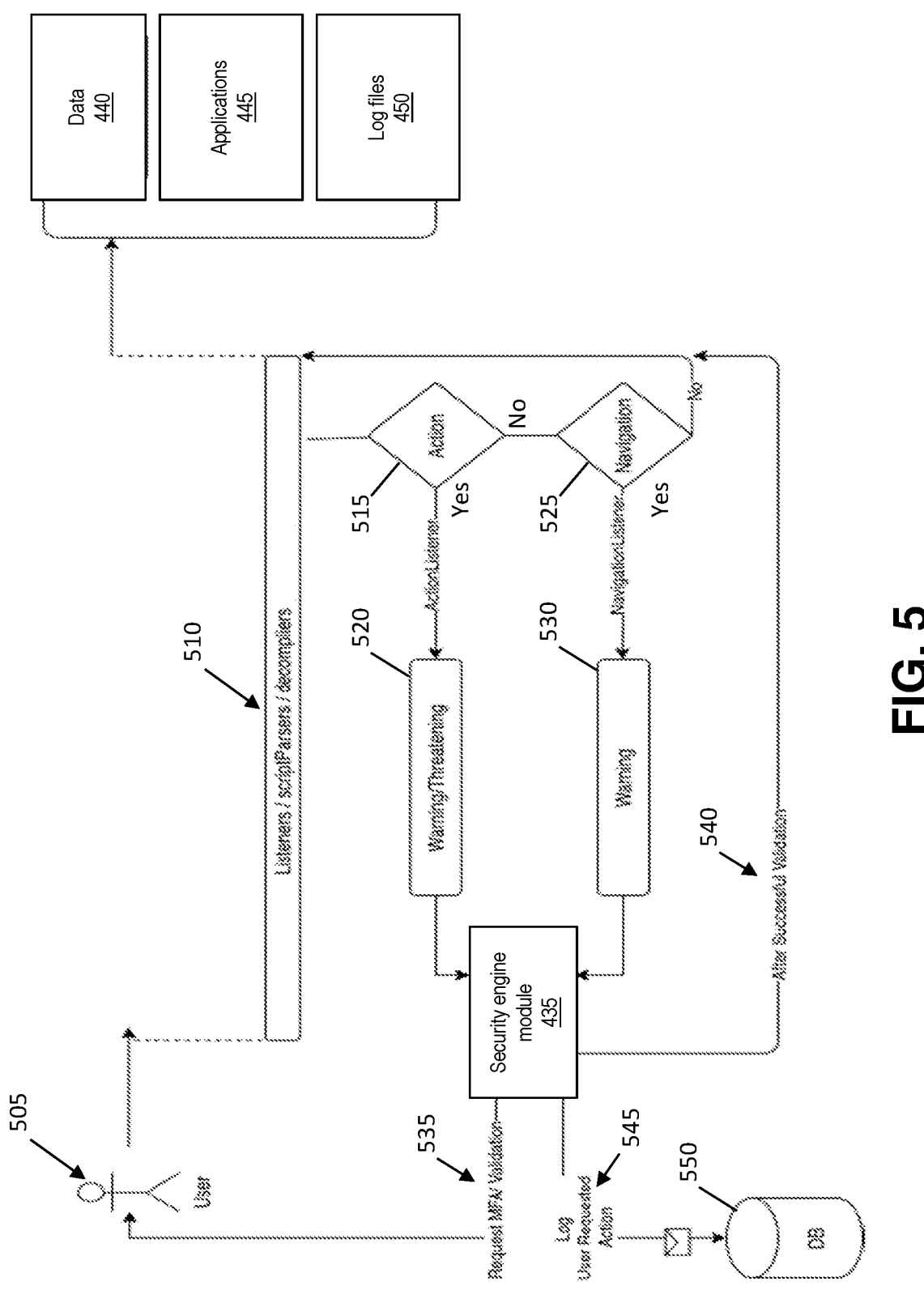
FIG. 5 shows a block diagram of a process in accordance with aspects of the invention.

FIG. 5 shows a block diagram of a process according to aspects of the invention. Steps in the block diagram may be carried out in the environment of FIG. 4 and are described with reference to elements depicted in FIG. 4. At step 505, a user (e.g., using one of the client devices 405*a-n*) provides commands to the system that includes the data 440, applications 445, and log files 450. At step 510, the daemon 437 listens to (e.g., monitors) the commands to determine if they are indicative of tampering with one of the log files 450. At step 515, the action listener module 430 determines whether one of the user commands includes an action that can edit or write to the log files 450. If yes, then at step 520 the action listener module 430 flags the one of the user commands as a warning or a threat as described with respect to FIG. 4. At step 525, the navigation listener module 425 determines whether one of the user commands includes a navigation to a folder or directory that contains one of the log files 450. If yes, then at step 530 the navigation listener module 425 flags the one of the user commands as a warning as described with respect to FIG. 4. As shown in FIG. 5, the security engine module 435 receives the data (e.g., flagged commands) from the navigation listener module 425 and the action listener module 430. The security engine module 435 may request MFA and/or validation at step 535. If the MFA and/or validation is successful, then at step 540 the daemon releases the command(s) to the kernel for execution. At step 545, the security engine module 435 may log the user's commands (e.g., the user requested action) to a database 550. Still referring to FIG. 5, if both determinations at steps 515 and 525 are no, then this command is deemed to not be indicative of tampering with one of the log files 450, and the command is permitted to continue executing in the kernel.

Figure 6:
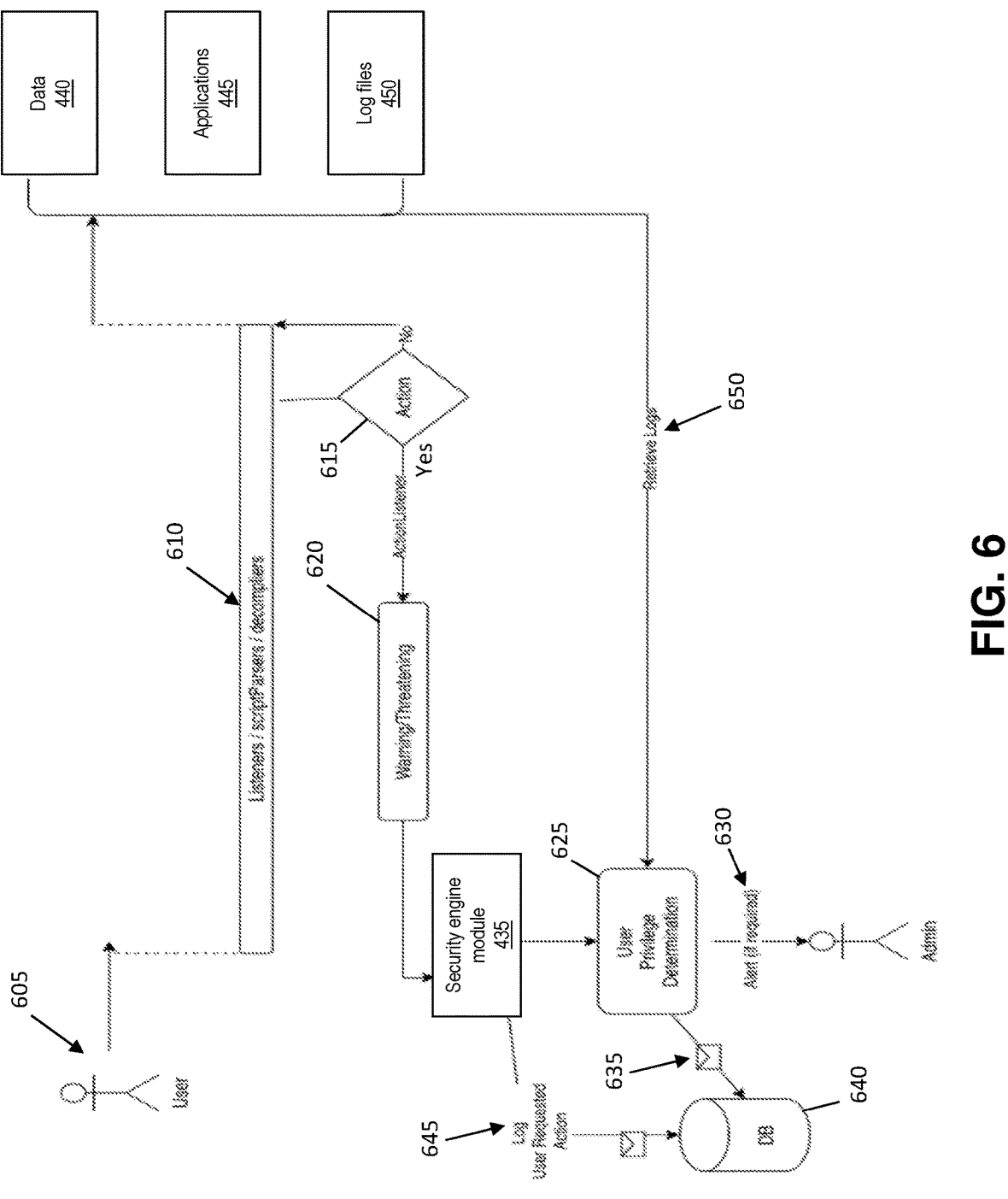
FIG. 6 shows a block diagram of a process in accordance with aspects of the invention.

In some implementations, the daemon 437 performs the described monitoring differently for different users, which enables more granular application of rules based on which user is logged into the system. For example, more strict rules may be applied to privileged users, while other (non-privileged) users may be subject to more permissive rules. In embodiments, this enables the system to run securely and faster. FIG. 6 shows a block diagram of a process that uses a user privilege determination in accordance with aspects of the invention. Steps in the block diagram may be carried out in the environment of FIG. 4 and are described with reference to elements depicted in FIG. 4. At step 605, a user (e.g., using one of the client devices 405a-n) provides commands to the system that includes the data 440, applications 445, and log files 450. At step 610, the daemon 437 listens to (e.g., monitors) the commands to determine if they are indicative of tampering with one of the log files 450. At step 615, the action listener module 430 determines whether one of the user commands includes an action that can edit or write to the log files 450. If yes, then at step 620 the action listener module 430 flags the one of the user commands as a warning or a threat as described with respect to FIG. 4. The security engine module 435 receives the data (e.g., flagged commands) from the action listener module 430. In this implementation, the security engine module 435 makes a user privilege determination at step 625. Based on the user privilege determination, the security engine module 435 may send an alert, e.g., to an administrator at step 630 and save details of the user privilege determination to database 635 at step 640. At step 645, the security engine module 435 may log the user's commands (e.g., the user requested action) to the database 550. Still referring to FIG. 5, if both determinations at steps 515 and 525 are no, then this command is deemed to not be indicative of tampering with one of the log files 450, and the command is permitted to continue executing in the kernel. Based on the user privilege determination, the security engine module 435 may retrieve logs (e.g., one or more of the log files 450) at step 650.

Figure 7:
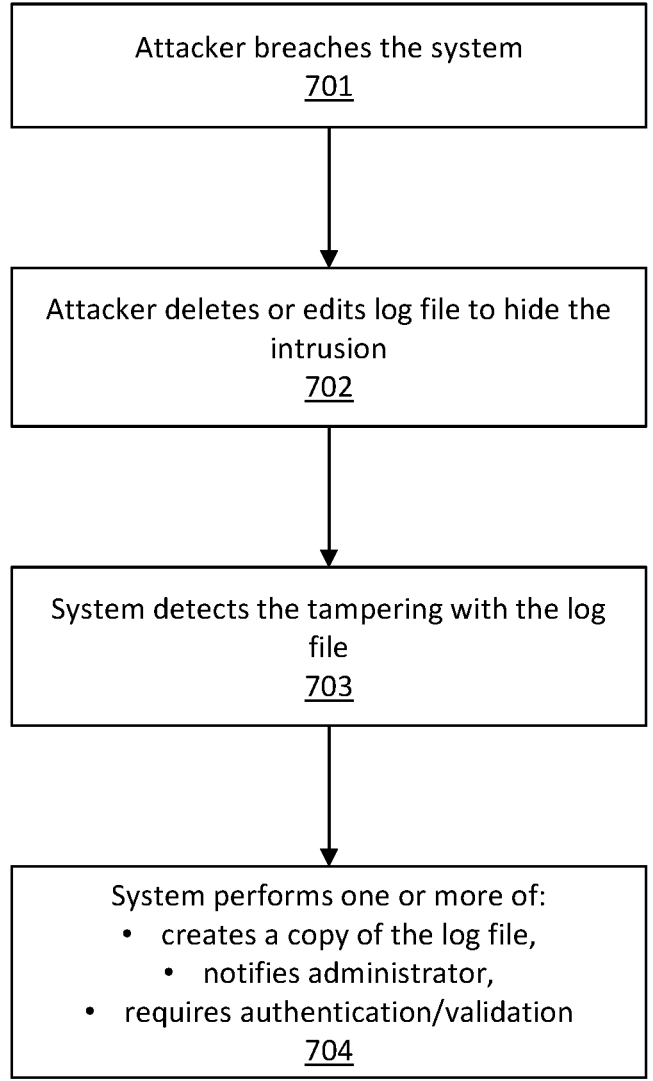
FIG. 7 illustrates an exemplary use case in accordance with aspects of the invention.

FIG. 7 illustrates an exemplary use case in accordance with aspects of the present invention. Steps of the use case may be carried out in the environment of FIG. 4 and are described with reference to elements depicted in FIG. 4. At step 701, an attacker breaches the system. For example, an attacker leverages one of the client devices (405a-n) or an unknown device to gain unauthorized access to the data 400. At step 702, the attacker attempts to delete or edit one or more of the log files 450 to hide the intrusion that occurred at step 701. For example, the attacker may issue a command to navigate to one of the log files and issue another command to edit or delete the log file. At step 703, the system detects the attempted tampering of step 702. For example, the daemon 437 monitors the OS 420 and identifies the command to navigate to the log file and the command to edit or delete the log file. This may include going into secure mode in response to identifying the command to navigate to the log file and, while in secure mode, determining to perform a security action in response to identifying the command to edit or delete the log file. At step 704, the system performs the security action, which can include: requiring multi-factor authentication (MFA) from a user; requiring external validation of the user; locking a computing device associated with the user; locking an account associated with the user; and alerting system administrator. In a high-availability environment, the security action can additionally include: creating a copy of the one or more log files; renaming the one or more log files; sending an alert to a system administrator including the copy of the one or more log files and the renamed one or more log files; and tracking actions of a user associated with the commands that are indicative of tampering.

FIG. 8 shows a flowchart of an exemplary method in accordance with aspects of the present invention. Steps of the method may be carried out in the environment of FIG. 4 and are described with reference to elements depicted in FIG. 4.

At step 805, the system monitors an operating system of a server that serves content to client computing devices. In embodiments, and as described with respect to FIG. 4, the daemon 437 monitors commands received at the OS 420 of the server 410. The server 410 maintains one or more log files 450 in one or more logs.

At step 810, the system determines, based on the monitoring, whether commands received at the operating system are indicative of tampering with one or more of the log files. In embodiments, and as described with respect to FIG. 4, the daemon 437 listens for predefined navigation commands and predefined file action commands. In embodiments, and as described with respect to FIG. 4, the predefined navigation commands include commands that navigate to a directory or folder that contains one or more of the log files (e.g., any of "cd", "cd..", "cd/", and "cd~"). In embodiments, and as described with respect to FIG. 4, the predefined file action commands include commands that delete, unlink, edit, or write to one or more of the log files (e.g., "rm", "del", "unlink", "vi", and "cat"). In embodiments, and as described with respect to FIG. 4, the monitoring can include decompiling a script into equivalent source code and analyzing the source code for the predefined navigation commands and the predefined file action commands.

In some embodiments, the determining at step 810 comprises running in a secure mode in response to identifying a navigation warning based on the monitoring, as described with respect to FIG. 4. In this example, the determining may further comprise identifying an action warning based on the monitoring and while running in the secure mode, where the predefined security action is performed in response to the identifying an action warning while running in the secure mode. In this example, the determining may further comprise identifying an action threat based on the monitoring and while running in the secure mode and determining whether a command is issued to save the one or more of the log files, wherein the predefined security action is performed in response to the determining a command is issued to save the one or more of the log files.

In some embodiments, the determining at step 810 is based on a system privilege level of a user, as described with respect to FIG. 6. In this example, the determining comprises applying a first rule to a first user having a first system privilege level, and applying a second rule to a second user having a second system privilege level that is different than the first system privilege level. In this example, the first system privilege level is higher than the second system privilege level, and the first rule is stricter than the second rule.

At step 815, in response to determining the commands are indicative of tampering with one or more of the log files, the system performs a predefined security action. In embodiments, and as described with respect to FIG. 4, the predefined security action is one or more selected from a group consisting of: requiring multi-factor authentication (MFA) from a user; requiring external validation of the user (e.g., from a system administrator); locking a computing device associated with the user (e.g., one of devices 405a-n); locking an account associated with the user; and alerting system administrator.

In embodiments, the server is part of a high-availability system (such as a public cloud), and the predefined security action may additionally include: creating a copy of the one or more log files; renaming the one or more log files; sending an alert to a system administrator including the copy of the one or more log files and the renamed one or more log files; and tracking actions of a user associated with the commands that are indicative of tampering.

At step 820, in response to determining the commands are not indicative of tampering with one or more of the log files, the system sends the commands to a kernel of the operating system for execution. In embodiments, and as described with respect to FIG. 4, the daemon 437 permits the commands to be executed by the OS 420 since these commands are deemed to not be associated with a threat.

As should be understood from the description of FIGS. 4 and 5, aspects of the invention, may be used to provide a computer-implemented process for preventing log forgery in high availability environments, the computer-implemented process comprising: monitoring a high availability environment using a set of listeners (e.g., navigation listener module 425 and action listener module 430) for a predetermined set of activities associated with a predetermined log file (e.g., one of log files 450) including an indication to delete, to modify and to remove the predetermined log file; in response to listening to at least one of a predetermined set of navigation instructions of an operating system of the high availability environment including any navigation to LOG folders, flagging the navigation instruction as a warning; in response to listening to at least one of a first predetermined set of actions targeted at the predetermined log file, including remove, delete, and unlink, associated with users of the high availability environment, flagging the at least one of a first predetermined set of actions as a warning; in response to listening to at least one of a second predetermined set of actions targeted at the predetermined log file associated with users of the high availability environment, flagging the at least one of the second predetermined set of actions as threatening; in response to receiving input from at least one listener (e.g., navigation listener module 425 and action listener module 430), determining by a security engine (e.g., security engine module 435) whether there is an indication of tampering of the predetermined log file; in response to determination by the security engine of a warning, enabling by the security engine a secure mode; in response to enabling by the security engine the secure mode, filtering all commands by the security engine prior to sending for execution; in response to receiving the warning by an action listener (e.g., action listener module 430), requesting at least one action from a set of predetermined actions including a request for multi-factor authentication, a request for external validation, a lock of a computer, a lock of a particular user and sending an alert to a predetermined user; in response to receiving a threat by the action listener (e.g., action listener module 430), monitoring for an exit command including a command issued to save the predetermined log file after close; in response to receiving the exit command including a command issued to save the predetermined log file after close, requesting at least one action from a set of predetermined actions including a request for multi-factor authentication, a request for external validation, a lock of a computer, a lock of a particular user and sending an alert to a predetermined user; in response to receiving a message of at least one of the warning and a threat while in a high availability mode, applying a plurality of additional actions including copying of the predetermined log in background, renaming the predetermined log as an original+date.log, sending an alert to the predetermined user including an original log and an altered log, and reporting additional user actions to the predetermined user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

monitoring, in a high-availability environment, an operating system of a server that serves content to client computing devices, wherein the server maintains log files, and wherein the monitoring is performed by a daemon running on the server and comprises the daemon listening for predefined navigation commands and predefined file action commands received at the operating system;

flagging the predefined navigation commands navigating to or requesting permission over one or more log files or a folder having the one or more log files as a warning, and the predefined file action commands to remove or edit the one or more log files as a warning or a threat respectively;

filtering all commands to pause file actions based on the predefined navigation commands and the predefined file action commands from being sent to a kernel of the operating system for execution;

determining whether the predefined navigation commands and the predefined file action commands received from a user are indicative of tampering with the one or more log files; and in response to the determining that the commands are indicative of tampering with the one or more log files, performing, by the daemon, a predefined security action, the performing comprising:

creating a copy of the one or more log files;

renaming the one or more log files; and sending an alert to a system administrator which includes the copy of the one or more log files and the renamed one or more log files.

2. The method of claim 1, wherein the predefined navigation commands include commands that navigate to a directory or folder that contains the one or more of the log files or commands requesting permission over the one or more of the log files or a directory or folder that contains the one or more of the log files.

3. The method of claim 1, wherein the predefined file action commands include commands that delete, unlink, edit, or write to the one or more of the log files.

4. The method of claim 1, wherein the daemon:

decompiles a script into equivalent source code; and prevents execution of the script based on identifying one of the predefined navigation commands and one of the predefined file action commands in the equivalent source code.

5. The method of claim 1, wherein the predefined security action is one or more selected from a group consisting of:

requiring multi-factor authentication (MFA) from the user;

requiring external validation of the user;

locking a computing device associated with the user;

locking an account associated with the user; and alerting a system administrator.

6. The method of claim 1, wherein the flagging comprises:

identifying a navigation warning based on the monitoring; and running in a secure mode based on the identifying the navigation warning.

7. The method of claim 6, wherein the flagging further comprises identifying an action warning based on the monitoring and while running in the secure mode.

8. The method of claim 6, wherein the flagging further comprises:

identifying an action threat based on the monitoring and while running in the secure mode; and determining whether one of the commands received at the operating system is a command to save the one or more of the log files.

9. The method of claim 6, wherein a module of the daemon acts as a wrapper layer that is configured to handle action-inside-scripts cases using decompile methods.

10. The method of claim 1, wherein the server is part of a high-availability system, and wherein the method further comprises:

tracking actions of the user associated with the commands that are indicative of tampering; and determining a level of compromise of data in the server based on the actions.

11. The method of claim 10, wherein the high-availability system comprises a public cloud.

12. The method of claim 1, wherein the determining is based on a system privilege level of the user.

13. The method of claim 12, wherein the determining comprises:

applying a first rule to a first user having a first system privilege level; and applying a second rule to a second user having a second system privilege level that is different than the first system privilege level.

14. The method of claim 13, wherein:

the first system privilege level is higher than the second system privilege level; and the first rule is stricter than the second rule.

15. The method of claim 1, wherein the daemon has direct access to kernel instructions of the operating system.

16. A computer program product comprising one or more computer readable storage media having program instructions collectively stored on the one or more computer readable storage media, the program instructions executable to:

monitor, in a high-availability environment, an operating system of a server that serves content to client computing devices, wherein the server maintains log files, and wherein the monitoring is performed by a daemon running on the server and comprises the daemon listening for predefined navigation commands and predefined file action commands received at the operating system;

flag the predefined navigation commands navigating to or requesting permission over one or more log files or a folder having the one or more log files as a warning, and the predefined file action commands to remove or edit the one or more log files as a warning or a threat respectively;

filter all commands to pause file actions based on the predefined navigation commands and the predefined file action commands from being sent to a kernel of the operating system for execution;

determine whether the predefined navigation commands and the predefined file action commands received from a user are indicative of tampering with the one or more log files, wherein the determining comprises:

causing the daemon to run in a secure mode based on identifying a first one of the commands received at the operating system as being one of the predefined navigation commands; and identifying, while the daemon is running in the secure mode, a second one of the commands received at the operating system as being one of the predefined file action commands; and in response to the determining that the commands are indicative of tampering with the one or more log files, perform, by the daemon, a predefined security action, comprising:

creating a copy of the one or more log files;

renaming the one or more log files; and sending an alert to a system administrator including the copy of the one or more log files and the renamed one or more log files.

17. The computer program product of claim 16, wherein:

the predefined navigation commands include commands that navigate to a directory or folder that contains the one or more of the log files; and the predefined file action commands include commands that delete, unlink, edit, or write to the one or more of the log files.

18. The computer program product of claim 16, wherein the predefined security action is one or more selected from a group consisting of:

requiring multi-factor authentication (MFA) from the user;

requiring external validation of the user;

locking a computing device associated with the user;

locking an account associated with the user; and alerting a system administrator.

19. The computer program product of claim 18, wherein the server is part of a high-availability system, and the program instructions are executable to:

track actions of the user associated with the commands that are indicative of tampering; and determine a level of compromise of data stored in the server based on the actions.

20. A system comprising:

a processor, a computer readable memory, one or more computer readable storage media, and program instructions collectively stored on the one or more computer readable storage media, the program instructions executable to:

monitor, in a high-availability environment, an operating system of a server that serves content to client computing devices, wherein the server maintains log files, and wherein the monitoring is performed by a daemon running on the server and comprises the daemon listening for predefined navigation commands and predefined file action commands received at the operating system;

flag the predefined navigation commands navigating to or requesting permission over one or more log files or a folder having the one or more log files as a warning, and the predefined file action commands to remove or edit the one or more log files as a warning or a threat respectively;

filter all commands to pause file actions based on the predefined navigation commands and the predefined file action commands from being sent to a kernel of the operating system for execution;

determine whether the predefined navigation commands and the predefined file action commands received from a user are indicative of tampering with the one or more log files, wherein the determining comprises: causing the daemon to run in a secure mode based on identifying a first one of the commands received at the operating system as being one of the predefined navigation commands; and, while the daemon is running in the secure mode, identifying a second one of the commands received at the operating system as being one of the predefined file action commands;

in response to the determining that the commands are indicative of tampering with the one or more log files, perform, by the daemon, a predefined security action comprising:

creating a copy of the one or more log files;

renaming the one or more log files; and sending an alert to a system administrator including the copy of the one or more log files and the renamed one or more log files; and send the second one of the commands to a kernel of the operating system for execution based on the user successfully authenticating or validating via the predefined security action.

* * * * *